US011932785B2

(12) United States Patent
Yamada et al.

(10) Patent No.: US 11,932,785 B2
(45) Date of Patent: Mar. 19, 2024

(54) EPOXY ADHESIVE COMPOSITION

(71) Applicant: SEKISUI CHEMICAL CO., LTD., Osaka (JP)

(72) Inventors: Tasuku Yamada, Shiga (JP); Shiori Tateno, Shiga (JP); Yousuke Chiba, Shiga (JP); Takayuki Maeda, Shiga (JP); Yukio Ochitani, Shiga (JP); Hideaki Tanaka, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 837 days.

(21) Appl. No.: 17/040,761

(22) PCT Filed: Mar. 11, 2019

(86) PCT No.: PCT/JP2019/009732
§ 371 (c)(1),
(2) Date: Sep. 23, 2020

(87) PCT Pub. No.: WO2019/188202
PCT Pub. Date: Oct. 3, 2019

(65) Prior Publication Data
US 2021/0002528 A1 Jan. 7, 2021

(30) Foreign Application Priority Data
Mar. 28, 2018 (JP) ................................ 2018-062503

(51) Int. Cl.
C09J 163/00 (2006.01)
C09J 11/04 (2006.01)

(52) U.S. Cl.
CPC ............. *C09J 163/00* (2013.01); *C09J 11/04* (2013.01)

(58) Field of Classification Search
CPC ................................ C09J 163/00; C09J 11/04
USPC ........................................................ 524/413
See application file for complete search history.

(56) References Cited

U.S. PATENT DOCUMENTS

| 2008/0145689 A1 | 6/2008 | Ogawa et al. | |
| 2009/0142686 A1* | 6/2009 | Kojima | G03G 15/0877 430/108.7 |
| 2018/0235090 A1* | 8/2018 | Onozeki | G03F 7/26 |

FOREIGN PATENT DOCUMENTS

| CN | 101002512 | 7/2007 | |
| EP | 1 235 472 | 8/2002 | |
| GB | 919549 | 2/1963 | |
| JP | 60-221473 | 11/1985 | |
| JP | 11-5828 | 1/1999 | |
| JP | 2000-212532 | 8/2000 | |
| JP | 2000-218734 | 8/2000 | |
| JP | 2000212532 A | * 8/2000 | |
| JP | 2002-285118 | 10/2002 | |
| JP | 2002285118 A | * 10/2002 | |
| JP | 2003-198141 | 7/2003 | |
| JP | 2004130696 A | * 4/2004 | |
| JP | 2006-159900 | 6/2006 | |
| JP | 2006-290997 | 10/2006 | |
| JP | 2007283745 A | * 11/2007 | |
| JP | 2008-130592 | 6/2008 | |
| JP | 2009-119855 | 6/2009 | |
| JP | 2011-51247 | 3/2011 | |
| JP | 2012-250543 | 12/2012 | |
| JP | 2013-110084 | 6/2013 | |
| JP | 2017-035843 | 2/2017 | |
| JP | 2017-132953 | 8/2017 | |
| JP | 2018-002766 | 1/2018 | |
| WO | 01/31985 | 5/2001 | |
| WO | 2017/026501 | 2/2017 | |

OTHER PUBLICATIONS

Translation of JP 2004-130696, Apr. 30, 2004. (Year: 2004).*
Translation of JP 2007-283745, Nov. 1, 2007. (Year: 2007).*
Extended European Search Report dated Dec. 9, 2021 in corresponding European Patent Application No. 19776334.5.
International Search Report dated May 14, 2019 in International (PCT) Patent Application No. PCT/JP2019/009732.

\* cited by examiner

*Primary Examiner* — Hui H Chin
(74) *Attorney, Agent, or Firm* — WENDEROTH, LIND & PONACK, L.L.P.

(57) ABSTRACT

The present invention provides an epoxy adhesive composition capable of reducing re-aggregation of an adhesive layer modifier, maintaining favorable viscosity for a long period of time, exhibiting high adhesiveness, and reducing process failures during application of the adhesive. Provided is an epoxy adhesive composition containing: a modified polyvinyl acetal resin having a constitutional unit with an acid-modified group; an adhesive layer modifier; and an epoxy resin, the epoxy adhesive composition having a ratio of an acid-modified group equivalent of the modified polyvinyl acetal resin to an epoxy equivalent of the epoxy resin (acid-modified group equivalent/epoxy equivalent) of 5.0 to 150.0, the epoxy adhesive composition having a number ratio of the acid-modified group to an epoxy group (acid-modified group number/epoxy group number) of 0.0005 to 0.5.

16 Claims, No Drawings

EPOXY ADHESIVE COMPOSITION

TECHNICAL FIELD

The present invention relates to an epoxy adhesive composition capable of reducing re-aggregation of an adhesive layer modifier, maintaining favorable viscosity for a long period of time, exhibiting high adhesiveness, and reducing process failures during application of the adhesive.

BACKGROUND ART

Epoxy adhesive compositions have conventionally used as adhesives for electronic materials or structural adhesives for automobiles or buildings owing to its excellent adhesiveness to various components and excellent durability.

However, epoxy adhesive compositions after being cured are hard and brittle to be easily broken upon application of an impact.

To approach this, Patent Literature 1 discloses that an epoxy resin composition containing an epoxy resin, a block urethane resin, a rubber-modified epoxy resin, rubber particles, and a latent curing agent has better shear adhesion strength and peel adhesion strength.

Patent Literature 2 discloses an adhesive composition containing a general-purpose epoxy resin, a modified epoxy resin, core-shell rubber particles, a reactive diluent, and a curing agent which has better viscosity properties to maintain adhesiveness.

However, adhesive compositions containing a modified epoxy resin and rubber particles as disclosed in Patent Literatures 1 and 2 exhibit still insufficient durability after being cured, resulting in insufficient reduction of adherent detachment. Moreover, in cases of porous adherends, such adhesive compositions permeate through the porous adherends, failing to exhibit sufficient adhesiveness.

To approach this, adhesive layer modifiers such as inorganic materials are added to improve the durability or adhesiveness. However, long-term storage of such adhesive compositions leads to an increase in viscosity due to aggregation of the adhesive layer modifiers or process failures such as clogging of nozzles due to sedimentation of the inorganic materials.

In view of the above state, an adhesive composition is desired which can well disperse an adhesive layer modifier, if containing one, to have better adhesiveness or durability, which can maintain high dispersibility even after long-term storage, and which can maintain high durability as well as reducing process failures.

CITATION LIST

Patent Literature

Patent Literature 1: JP 2018-2766 A
Patent Literature 2: JP 2017-132953 A

SUMMARY OF INVENTION

Technical Problem

In consideration of the state of the art, the present invention aims to provide an epoxy adhesive composition capable of reducing re-aggregation of an adhesive layer modifier, maintaining favorable viscosity for a long period of time, exhibiting high adhesiveness, and reducing process failures during application of the adhesive.

Solution to Problem

The present invention relates to an epoxy adhesive composition containing: a modified polyvinyl acetal resin having a constitutional unit with an acid-modified group; an adhesive layer modifier; and an epoxy resin, the epoxy adhesive composition having a ratio of an acid-modified group equivalent of the modified polyvinyl acetal resin to an epoxy equivalent of the epoxy resin (acid-modified group equivalent/epoxy equivalent) of 5.0 to 150.0, the epoxy adhesive composition having a number ratio of the acid-modified group to an epoxy group (acid-modified group number/epoxy group number) of 0.0005 to 0.5.

The present invention is specifically described in the following.

The present inventors made intensive studies to find out that use of a polyvinyl acetal resin in combination with an epoxy resin and an adhesive layer modifier can improve the dispersibility and dispersion stability of the adhesive layer modifier and can reduce an increase in viscosity or failures during the process for application of the adhesive due to aggregation of the adhesive layer modifier. Thus, the present invention was completed.

The epoxy adhesive composition of the present invention contains a polyvinyl acetal resin.

In the present invention, use of a polyvinyl acetal resin enables reduction of aggregation of an adhesive layer modifier in cases where the adhesive layer modifier is added to improve the adhesiveness. Moreover, the dispersibility of the adhesive layer modifier can be maintained even after long-term storage, thereby preventing an increase in viscosity of the adhesive.

The polyvinyl acetal resin is a modified polyvinyl acetal resin having an acid-modified group.

With the incorporation of such a modified polyvinyl acetal resin, the epoxy adhesive composition also containing an epoxy resin can form a crosslinked structure between the modified polyvinyl acetal resin and the epoxy resin. Accordingly, a crosslinked product obtained after the crosslinking has appropriate elasticity as well as high mechanical strength. In addition, curing shrinkage is slowed to reduce, when used for bonding of different materials, warping or detachment of adhering parts caused by difference in degree of shrinkage between the materials.

The modified polyvinyl acetal resin has a constitutional unit with an acid-modified group.

Examples of the acid-modified group include carboxyl, sulfonic acid, maleic acid, sulfinic acid, sulfenic acid, phosphoric acid, phosphonic acid, and amino groups, and salts thereof. Preferred among these is a carboxyl group.

The modified polyvinyl acetal resin having the constitutional unit with an acid-modified group has better compatibility with an epoxy resin to realize high mechanical strength.

The constitutional unit with an acid-modified group may have a structure in which an acid-modified group as a side chain is directly bonded to a carbon atom constituting the main chain or a structure in which an acid-modified group as a side chain is bonded to a carbon atom constituting the main chain via an alkylene group.

The constitutional unit with an acid-modified group may have a steric structure in which two acid-modified groups are bonded to the same carbon atom constituting the main chain or a steric structure in which one acid-modified group is bonded to a carbon atom constituting the main chain. Alternatively, the constitutional unit with an acid-modified group may have a steric structure in which an acid-modified group is bonded to each of adjacent carbon atoms constituting the main chain or a steric structure in which an acid-modified group is bonded to one of the adjacent carbon atoms constituting the main chain. A preferred structure is a steric structure in which two acid-modified groups are bonded to the same carbon atom constituting the main chain or a steric structure in which an acid-modified group is bonded to each of adjacent carbon atoms constituting the main chain. Moreover, an increase in the steric hindrance can widen the network structure of a cured product obtainable by combining the modified polyvinyl acetal resin and the epoxy resin. As a result, a cured product to be obtained has better flexibility. Accordingly, the constitutional unit with an acid-modified group more preferably has a steric structure in which two acid-modified groups are bonded to the same carbon atom constituting the main chain.

The constitutional unit with an acid-modified group may have a steric structure in which acid-modified groups are bonded to carbon atoms constituting the main chain on one side (isotactic arrangement) or a steric structure in which acid-modified groups are bonded to carbon atoms constituting the main chain at alternate positions along the chain (syndiotactic arrangement). Moreover, it may have a steric structure in which the acid-modified groups are randomly bonded (atactic arrangement).

In the case where the constitutional unit with an acid-modified group has a structure in which an acid-modified group is bonded to a carbon atom constituting the main chain via an alkylene group, the alkylene group is preferably a C1-C10 alkylene group, more preferably a C1-C5 alkylene group, still more preferably a C1-C3 alkylene group.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups.

Preferred among these are linear alkylene groups, more preferred are methylene, vinylene, and n-propylene groups, and still more preferred are methylene and vinylene groups.

Examples of the constitutional unit with a carboxyl group include a constitutional unit represented by the following formula (1-1), a constitutional unit represented by the following formula (1-2), a constitutional unit represented by the following formula (1-3), and a constitutional unit represented by the following formula (1-4).

[Chem. 1]

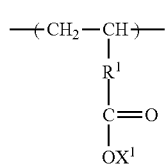
(1-1)

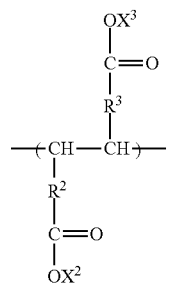
(1-2)

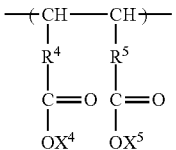
(1-3)

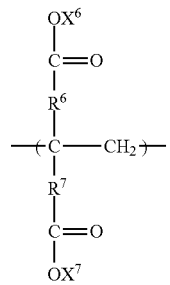
(1-4)

In the formula (1-1), $R^1$ represents a single bond or a C1-C10 alkylene group, and $X^1$ represents a hydrogen atom, metal atom, or a methyl group.

$R^1$ is preferably a single bond or a C1-C5 alkylene group, more preferably a single bond or a C1-C3 alkylene group.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups. Preferred among these are linear alkylene groups, more preferred are methylene, vinylene, and n-propylene groups, and still more preferred are methylene and vinylene groups.

Examples of the metal atom include sodium, lithium, and potassium atoms. Preferred among these is sodium atom.

In the formula (1-2), $R^2$ and $R^3$ each independently represent a single bond or a C1-C10 alkylene group, and $X^2$ and $X^3$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-3), $R^4$ and $R^5$ each independently represent a single bond or a C1-C10 alkylene group, and $X^4$ and $X^5$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-4), $R^6$ and $R^7$ each independently represent a single bond or a C1-C10 alkylene group, and $X^6$ and $X^7$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In particular, the modified polyvinyl acetal resin has a structure of preferably any of the formulas (1-2) to (1-4), more preferably the formula (1-4) because the steric hindrance is increased and the network structure of a cross-linked structure formed between the modified polyvinyl acetal resin and the epoxy resin is widened to further improve the impact resistance of a cured product to be obtained.

Examples of the constitutional unit having a sulfonic acid group include a constitutional unit represented by the following formula (2-1), a constitutional unit represented by the following formula (2-2), a constitutional unit represented by the following formula (2-3), and a constitutional unit represented by the following formula (2-4).

[Chem. 2]

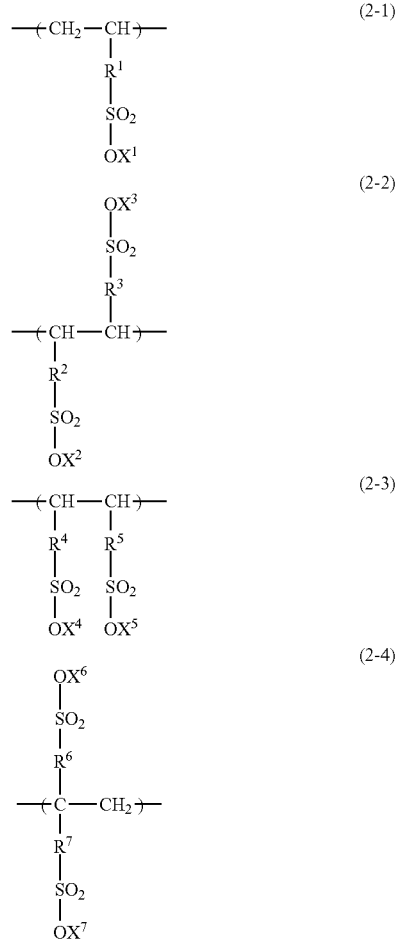

Examples of $R^1$ to $R^7$ and $X^1$ to $X^7$ in the formulas (2-1) to (2-4) include those mentioned for $R^1$ to $R^7$ and $X^1$ to $X^7$ in the formulas (1-1) to (1-4).

In the modified polyvinyl acetal resin, the acid-modified group may be directly bonded to a carbon atom constituting the main chain of the modified polyvinyl acetal resin or bonded to a carbon atom via a linking group such as an alkylene group.

The modified polyvinyl acetal resin may have the constitutional unit with an acid-modified group in a side chain.

In the modified polyvinyl acetal resin, the lower limit of the amount of the constitutional unit with an acid-modified group is preferably 0.01 mol % and the upper limit thereof is preferably 10 mol %.

When the amount of the constitutional unit with an acid-modified group is 0.01 mol % or more, the modified polyvinyl acetal resin shows excellent curability with an epoxy resin. When the amount of the constitutional unit with an acid-modified group is 10 mol % or less, the storage stability can be improved. The lower limit of the amount of the constitutional unit with an acid-modified group is more preferably 0.05 mol %. The upper limit thereof is more preferably 5.0 mol %, still more preferably 3.0 mol %. The amount of the constitutional unit with an acid-modified group can be measured by, for example, NMR.

The lower limit of the acid-modified group equivalent (molecular weight per acid-modified group) of the modified polyvinyl acetal resin is preferably 100, more preferably 500, and the upper limit thereof is preferably 50,000, more preferably 30,000, still more preferably 15,000.

The acid-modified group equivalent of the modified polyvinyl acetal resin can be calculated as follows. The molecular weight of the modified polyvinyl acetal resin is calculated based on the degree of polymerization of the modified polyvinyl acetal resin, the amount of each constitutional unit, and the molecular weight of each constitutional unit. The obtained molecular weight is divided by the number of acid-modified groups per mole of the modified polyvinyl acetal resin. The obtained quotient is the acid-modified group equivalent.

The modified polyvinyl acetal resin has a constitutional unit with an acetal group represented by the following formula (3-1), a constitutional unit with a hydroxyl group represented by the following formula (3-2), and a constitutional unit with an acetyl group represented by the following formula (3-3).

[Chem. 3]

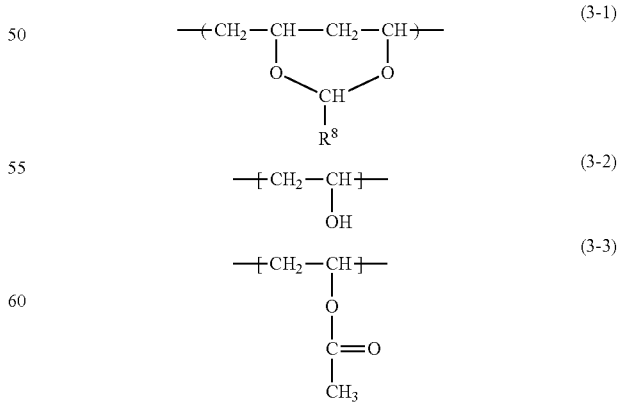

In the formula (3-1), $R^8$ represents a hydrogen atom or a C1-C20 alkyl group.

$R^8$ is preferably a hydrogen atom or a C1-C12 alkyl group.

Examples of the C1-C20 alkyl group include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl groups. Preferred among these are methyl, ethyl, and propyl groups.

In the modified polyvinyl acetal resin, the lower limit of the amount of the constitutional unit with an acetal group (hereafter, also referred to as acetal group content) is preferably 60 mol % and the upper limit thereof is preferably 90 mol %. When the acetal group content is 60 mol % or more, the polyvinyl acetal resin can be sufficiently precipitated in the synthesis process by a precipitation method. When the acetal group content is 90 mol % or less, the compatibility with an epoxy resin is enhanced. The lower limit of the acetal group content is more preferably 65 mol % and the upper limit thereof is more preferably 85 mol %.

Since an acetal group in a polyvinyl acetal resin is obtained by acetalizing two hydroxyl groups in polyvinyl alcohol, a method of counting two acetalized hydroxyl groups is employed as a method for calculating the acetal group content.

The ratio between the butyral group content and the acetoacetal group content in the polyvinyl acetal resin is preferably 4:6 to 0:10, more preferably 3:7 to 0:10.

The butyral group refers to an acetal group in the constitutional unit with an acetal group represented by the formula (3-1) wherein $R^8$ represents a propyl group. The acetoacetal group refers to an acetal group in the constitutional unit with an acetal group represented by the formula (3-1) wherein $R^8$ represents a methyl group.

The lower limit of the amount of the constitutional unit with a hydroxyl group (hereafter, also referred to as hydroxyl group content) in the polyvinyl acetal resin is preferably 15 mol % and the upper limit thereof is preferably 35 mol %. When the hydroxyl group content is 15 mol % or more, the toughness of the polyvinyl acetal resin is sufficiently high, leading to favorable strength of a cured product to be obtained. When the hydroxyl group content is 35 mol % or less, the polarity of the polyvinyl acetal resin is not too high, so that troubles such as cracking in a cured product to be obtained are reduced, and peeling properties are favorable. The lower limit of the hydroxyl group content is more preferably 17 mol % and the upper limit thereof is more preferably 30 mol %.

The lower limit of the amount of the constitutional unit with an acetyl group (hereafter, also referred to as acetyl group content) in the polyvinyl acetal resin is preferably 0.0001 mol % and the upper limit thereof is preferably 15 mol %.

The average degree of polymerization of the polyvinyl acetal resin is not limited. The lower limit thereof is preferably 150 and the upper limit thereof is preferably 4,500. When the degree of polymerization of the polyvinyl acetal resin is 150 or more, the resulting epoxy adhesive composition has sufficient viscosity. When the degree of polymerization of the polyvinyl acetal resin is 4,500 or less, the application properties of the resulting epoxy adhesive composition are favorable in the use where the composition is applied, resulting in better handleability. Moreover, the adhesive force is further improved.

The lower limit of the average degree of polymerization is more preferably 200 and the upper limit thereof is more preferably 4,000.

The polyvinyl acetal resin may have any shape. Preferably, the polyvinyl acetal resin has a particulate shape.

In the case where the polyvinyl acetal resin has a particulate shape, the lower limit of the dispersion diameter (D50) of the polyvinyl acetal resin is preferably 0.1 µm, more preferably 0.2 µm, still more preferably 5.0 µm, and the upper limit thereof is preferably 100 µm, more preferably 90 µm.

The dispersion diameter (D50) can be measured by, for example, particle size distribution measurement by a laser diffraction method. The dispersion diameter (D50) is a particle size measured by a laser diffraction method or the like after dispersing the adhesive layer modifier in a dispersing medium, and refers to a standard particle size in the case where the number of particles having a particle size larger than the standard particle size and the number of particles having a particle size smaller than the standard particle size are the same.

Examples of the method of producing the polyvinyl acetal resin include a method of acetalizing, by a conventionally known method, polyvinyl alcohol obtained by saponification of polyvinyl acetate.

Examples of the method of producing the modified polyvinyl acetal resin include a method of acetalizing, by a conventionally known method, polyvinyl alcohol obtained by saponification of polyvinyl acetate that is prepared by copolymerization of a monomer having an acid-modified group and vinyl acetate. An acid-modified group may be introduced by post modification of a polyvinyl acetal resin that is prepared by acetalizing, by a conventionally known method, unmodified polyvinyl alcohol.

In other words, the modified polyvinyl acetal resin may be an acetalization product of polyvinyl alcohol having an acid-modified group or an acetalization product of unmodified polyvinyl alcohol to which an acid-modified group is introduced.

Examples of the monomer having an acid-modified group include monocarboxylic acids such as acrylic acid, crotonic acid, methacrylic acid, and oleic acid, dicarboxylic acids such as methylene malonic acid, itaconic acid, 2-methylene glutaric acid, 2-methylene adipic acid, and 2-methylene sebacic acid, maleic anhydride, and metal salts of these.

The acetalization may be carried out by a known method, and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, amide solvents, and amine solvents.

Examples of the alcoholic organic solvents include methanol, ethanol, n-propanol, isopropanol, n-butanol, and tert-butanol.

Examples of the aromatic organic solvent include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of solubility in resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluene sulfonic acid. These acid catalysts may be used alone, or two or more types of compounds may be used in combination. Preferred among these are hydrochloric acid, nitric acid, and sulfuric acid, and particularly preferred is hydrochloric acid.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

These aldehydes may be used alone, or two or more types thereof may be used in combination. Preferred among these aldehydes are formaldehyde, acetaldehyde, butyraldehyde, 2-ethylhexylaldehyde, and n-nonylaldehyde because they are excellent in acetalization reactivity and can give the resin to be prepared a sufficient internal plasticization effect to impart favorable flexibility. More preferred are formaldehyde, acetaldehyde, and butyraldehyde because they can provide an adhesive composition particularly excellent in impact resistance and adhesiveness to metal.

The amount of the aldehyde can be appropriately determined in accordance with the acetal group content of the aimed polyvinyl acetal resin. In particular, the amount is 60 to 95 mol %, preferably 65 to 90 mol % relative to 100 mol % of the polyvinyl alcohol because the acetalization reaction can be carried out efficiently and an unreacted aldehyde is easily removable.

In the epoxy adhesive composition of the present invention, the lower limit of the amount of the polyvinyl acetal resin is preferably 0.5% by weight and the upper limit thereof is preferably 50% by weight.

When the amount of the polyvinyl acetal resin is 0.5% by weight or more, high toughness can be exhibited when the epoxy adhesive composition is used as an adhesive. When the amount is 50% by weight or less, high adhesiveness can be exhibited.

The lower limit of the amount of the polyvinyl acetal resin is more preferably 1.0% by weight, still more preferably 10% by weight, and the upper limit thereof is more preferably 40% by weight, still more preferably 30% by weight.

The epoxy adhesive composition of the present invention contains an adhesive layer modifier.

With the incorporation of the adhesive layer modifier, the epoxy adhesive composition can give a cured product having better strength and adhesiveness.

The adhesive layer modifier may be, for example, an inorganic material.

Examples of the inorganic material include metal compounds, carbon substances, and glass.

Examples of the metal compounds include oxides, hydroxides, nitrides, carbonates, and sulfates of metals. Examples of the oxides include aluminum oxide, silicon oxide, titanium oxide, zirconium oxide, zinc oxide, tin oxide, copper oxide, and nickel oxide. Examples of the hydroxides include aluminum hydroxide, magnesium hydroxide, calcium hydroxide, zinc hydroxide, and copper hydroxide. Examples of the nitrides include aluminum nitride, silicon nitride, boron nitride, and gallium nitride. Examples of the carbonates include calcium carbonate. Examples of the sulfates include barium sulfate and magnesium sulfate.

Examples of the carbon substances include carbon black, carbon nanotube, carbon fiber, and diamond.

Preferred among these are metal compounds, more preferred are metal compounds that are oxides, carbonates, or sulfates, and still more preferred are silicon oxide, calcium carbonate, and barium sulfate.

The lower limit of the dispersion diameter (D50) of the adhesive layer modifier is preferably 0.1 μm and the upper limit thereof is preferably 100 μm.

When the dispersion diameter (D50) of the adhesive layer modifier is 0.1 μm or more, a cured product to be obtained has better thickness precision, leading to improvement of the adhesion reliability. When the dispersion diameter (D50) of the adhesive layer modifier is 100 μm or less, the dispersibility can be sufficiently enhanced, leading to favorable viscosity and dispersion stability.

The lower limit of the dispersion diameter (D50) of the adhesive layer modifier is more preferably 0.2 μm and the upper limit thereof is more preferably 90 μm.

The dispersion diameter (D50) can be measured by, for example, particle size distribution measurement by a laser diffraction method. The dispersion diameter (D50) is a particle size measured by a laser diffraction method or the like after dispersing the adhesive layer modifier in a dispersing medium, and refers to a standard particle size in the case where the number of particles having a particle size larger than the standard particle size and the number of particles having a particle size smaller than the standard particle size are the same.

In the epoxy adhesive composition of the present invention, the lower limit of the ratio between the dispersion diameter (D50) of the polyvinyl acetal resin and the dispersion diameter (D50) of the adhesive layer modifier (dispersion diameter (D50) of modified polyvinyl acetal resin/ dispersion diameter (D50) of adhesive layer modifier) is preferably 0.001, more preferably 0.5, still more preferably 1.0. The upper limit of the ratio between the dispersion diameter (D50) of the polyvinyl acetal resin and the dispersion diameter (D50) of the adhesive layer modifier (dispersion diameter (D50) of modified polyvinyl acetal resin/dispersion diameter (D50) of adhesive layer modifier) is preferably 1,000, more preferably 500, still more preferably 300.

The lower limit of the dispersion diameter (D10) of the adhesive layer modifier is preferably 0.01 µm, still more preferably 0.05 µm, and the upper limit thereof is preferably 20 µm, more preferably 18 µm.

The dispersion diameter (D10) can be measured by, for example, particle size distribution measurement by a laser diffraction method. The dispersion diameter (D10) is a particle size measured by a laser diffraction method or the like after dispersing the adhesive layer modifier in a dispersing medium, and refers to a 10% cumulative particle size from the small particle size side in the number-based particle size distribution.

The lower limit of the ratio between the dispersion diameter (D10) and the dispersion diameter (D50) of the adhesive layer modifier (dispersion diameter (D10)/dispersion diameter (D50)) is preferably 0.0001, more preferably 0.05, still more preferably 0.07, and the upper limit thereof is preferably 1.0, more preferably 0.8, still more preferably 0.7.

The lower limit of the dispersion diameter (D90) of the adhesive layer modifier is preferably 0.5 µm, more preferably 0.6 µm, and the upper limit thereof is preferably 1,000 µm, more preferably 500 µm, still more preferably 200 µm.

The dispersion diameter (D90) can be measured by, for example, particle size distribution measurement by a laser diffraction method. The dispersion diameter (D90) is a particle size measured by a laser diffraction method or the like after dispersing the adhesive layer modifier in a dispersing medium, and refers to a 90% cumulative particle size from the small particle size side in the number-based particle size distribution.

The lower limit of the ratio between the dispersion diameter (D90) and the dispersion diameter (D50) of the adhesive layer modifier (dispersion diameter (D90)/dispersion diameter (D50)) is preferably 1.0, more preferably 1.1, still more preferably 1.2, and the upper limit thereof is preferably 10,000, more preferably 100, still more preferably 10.

The lower limit of the density of the adhesive layer modifier is preferably 0.1 g/cm$^3$ and the upper limit thereof is preferably 10.0 g/cm$^3$.

The density can be measured with, for example, a specific gravity measuring device (AUW220D, product of Shimadzu Corporation).

The lower limit of the BET specific surface area of the adhesive layer modifier is preferably 0.001 m$^2$/g, more preferably 0.01 m$^2$/g, and the upper limit thereof is preferably 350 m$^2$/g, more preferably 100 m$^2$/g.

The BET specific surface area can be measured with, for example, a specific surface area measuring device (ASAP-2000, product of Shimadzu Corporation) using nitrogen gas.

The lower limit of the bulk density of the adhesive layer modifier is preferably 0.05 g/cm$^3$, more preferably 0.07 g/cm$^3$, and the upper limit thereof is preferably 5.0 g/cm$^3$, more preferably 2.5 g/cm$^3$.

The bulk density can be measured with, for example, a powder characteristics tester (powder tester PT-X, product of Hosokawa Micron Corporation).

The lower limit of the water content of the adhesive layer modifier is preferably 0.01%, more preferably 0.1%, and the upper limit thereof is preferably 3.0%, more preferably 2.0%.

The water content can be obtained as follows, for example. A sample is prepared by vacuum-drying at 60° C. at a gauge pressure of −9.47×10$^4$ Pa or less for two hours, followed by cooling to room temperature in a silica gel desiccator. Measurement is performed on the obtained sample using a thermogravimetry analyzer (TG/DTA7300, product of Hitachi High-Tech Science Corporation).

Examples of the shape of the adhesive layer modifier include a plate shape, a scaly shape, an acicular shape, a columnar shape, a spherical shape, a polyhedral shape, and a bulk shape. Preferred are a plate shape and a scaly shape. Multiple adhesive layer modifiers having these shapes may be used in combination.

The adhesive layer modifier is preferably insoluble in pure water. Here, "insoluble in pure water" means that the adhesive layer modifier dispersed in pure water is substantially not dissolved. For example, the size of the adhesive layer modifier observed using a transmission electron microscope is not shrunk in pure water.

In the epoxy adhesive composition of the present invention, the lower limit of the amount of the adhesive layer modifier is preferably 1% by weight, more preferably 5% by weight and the upper limit thereof is preferably 50% by weight, more preferably 40% by weight.

In the epoxy adhesive composition of the present invention, the lower limit of the ratio between the molecular weight of the polyvinyl acetal resin and the molecular weight of the adhesive layer modifier (molecular weight of modified polyvinyl acetal resin/molecular weight of adhesive layer modifier) is preferably 20, more preferably 30 and the upper limit thereof is preferably 7,500, more preferably 6,750, still more preferably 2,400.

In the epoxy adhesive composition of the present invention, the acid-modified group equivalent of the polyvinyl acetal resin and the BET specific surface area of the adhesive layer modifier satisfy a ratio (acid-modified group equivalent/BET specific surface area (m$^2$/g)) of preferably 0.2 to 50,000,000, more preferably 1.0 to 30,000,000, still more preferably 10 to 1,500,000.

The epoxy adhesive composition of the present invention contains an epoxy resin.

Incorporation of the epoxy resin enables crosslinking under application of energy by heating or the like, realizing high adhesiveness.

Examples of the epoxy resin include aromatic epoxy resins, heterocyclic epoxy resins, and aliphatic epoxy resins.

Examples of the aromatic epoxy resins include glycidyl ethers and glycidyl esters of polyphenols and glycidyl aromatic polyamines.

Examples of the glycidyl ethers of polyphenols include bisphenol A-type epoxy resins, bisphenol F-type epoxy resins, phenol novolac-type epoxy resins.

Examples of the glycidyl esters of polyphenols include diglycidyl phthalate, diglycidyl isophthalate, and diglycidyl terephthalate.

Examples of the glycidyl aromatic polyamines include N,N-diglycidyl aniline, N,N,N',N'-tetraglycidyl xylylenediamine, and N,N,N',N'-tetraglycidyl diphenylmethane diamine.

Examples of the heterocyclic epoxy resins include triglycidyl isocyanate and triglycidyl melamine.

Examples of the aliphatic epoxy resins include glycidyl ethers of aliphatic alcohols and glycidyl esters of polyvalent fatty acids.

Examples of the glycidyl ethers of aliphatic alcohols include butyl glycidyl ether, lauryl glycidyl ether, neopentyl glycol diglycidyl ether, and polypropylene glycol diglycidyl ether.

Examples of the glycidyl esters of polyvalent fatty acids include diglycidyl oxalate, diglycidyl maleate, diglycidyl succinate, diglycidyl glutarate, diglycidyl adipate, and diglycidyl pimelate.

One type of the epoxy resin may be used alone, or two or more thereof may be used in combination. From the standpoint of improving the adhesive force, an aromatic epoxy resin is preferably used, with the use of an aromatic epoxy resin and an aliphatic epoxy resin being more preferred.

The lower limit of the epoxy equivalent (molecular weight per single epoxy group) of the epoxy resin is preferably 90 and the upper limit thereof is preferably 700.

When the epoxy equivalent is not less than the preferable lower limit, a curing failure is not likely to occur, leading to sufficient improvement of the mechanical strength. When the epoxy equivalent is not more than the preferable upper limit, the molecular weight between crosslinking points is lowered, leading to improvement of the neat resistance.

The lower limit of the epoxy equivalent is more preferably 100 and the upper limit thereof is more preferably 600.

In cases where the epoxy resin includes multiple different epoxy resins, the epoxy equivalent can be calculated by multiplying the epoxy equivalent and the blending ratio (wt %) of each epoxy resin and summing up the obtained products.

In the epoxy adhesive composition of the present invention, the lower limit of the ratio between the acid-modified group equivalent of the modified polyvinyl acetal resin and the epoxy equivalent of the epoxy resin (acid-modified group equivalent/epoxy equivalent) is 5.0 and the upper limit thereof is 150.

When the ratio is not less than the lower limit and not more than the upper limit, the gel fraction can be improved without lowering the storage stability of the adhesive.

The lower limit of the ratio is preferably 7.0 and the upper limit thereof is preferably 120.

The lower limit of the molecular weight of the epoxy resin is preferably 100 and the upper limit thereof is preferably 5,500.

When the molecular weight is 100 or more, the mechanical strength and heat resistance of the crosslinked product can be sufficiently improved. When the molecular weight is 5,500 or less, the cross linked product is not too rigid and has sufficient strength.

The molecular weight is more preferably 200 to 1,000.

In the epoxy adhesive composition of the present invention, the lower limit of the amount of the epoxy resin is preferably 0.5% by weight and the upper limit thereof is preferably 99.5% by weight.

When the amount of the epoxy resin is 0.5% by weight or more, the adhesiveness can be further improved. When the amount of the epoxy resin is 99.5% by weight or less, the toughness can be improved.

The lower limit of the amount of the epoxy resin is more preferably 1.0% by weight and the upper limit thereof is more preferably 90.0% by weight.

In the epoxy adhesive composition of the present invention, the lower limit of the amount of the polyvinyl acetal resin per 100 parts by weight of the epoxy resin is preferably 0.5 parts by weight and the upper limit thereof is preferably 100 parts by weight.

When the amount of the polyvinyl acetal resin is 0.5 parts by weight or more, the toughness is sufficient. When the amount of the polyvinyl acetal resin is 100 parts by weight or less, the adhesiveness is sufficient.

The lower limit of the amount of the polyvinyl acetal resin is more preferably 1.0 part by weight and the upper limit thereof is more preferably 80 parts by weight.

In the epoxy resin composition of the present invention, the lower limit of the amount of the adhesive layer modifier per 100 parts by weight of the epoxy resin is preferably 1.0 part by weight, more preferably 6.0 parts by weight and the upper limit thereof is preferably 115 parts by weight, more preferably 80 parts by weight.

In the epoxy adhesive composition of the present invention, the lower limit of the number ratio between the acid-modified groups in the modified polyvinyl acetal resin and the epoxy groups in the epoxy resin (acid-modified group number/epoxy group number) is 0.0005 and the upper limit thereof is 0.5. The lower limit is preferably 0.00075, more preferably 0.001 and the upper limit is preferably 0.25, more preferably 0.05.

When the number ratio between the acid modified groups and the epoxy groups is not less than the lower limit and not more than the upper limit, the resulting epoxy adhesive composition can provide a cured product with better impact resistance.

Here, the "acid-modified group number" can be calculated based on the amount and acid-modified group equivalent of the modified polyvinyl acetal resin in the epoxy adhesive composition of the present invention.

Also, the "epoxy group number" can be calculated based on the amount and epoxy equivalent of the epoxy resin in the epoxy adhesive composition of the present invention.

The amount of the organic solvent in the epoxy adhesive composition of the present invention is 10.0% by weight or less, preferably 0% by weight.

When the amount of the organic solvent is 10.0% by weight or less, curing inhibition is not likely to occur.

Examples of the organic solvent include ketones, alcohols, aromatic hydrocarbons, and esters.

Examples of the ketones include acetone, methyl ethyl ketone, dipropyl ketone, and diisobutyl ketone.

Examples of the alcohols include methanol, ethanol, isopropanol, and butanol.

Examples of the aromatic hydrocarbons include toluene and xylene.

Examples of the esters include methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate.

Also usable are methyl cellosolve, ethyl cellosolve, butyl cellosolve, terpineol, dihydroterpineol, butyl cellosolve acetate, butyl carbitol acetate, terpineol acetate, and dihydroterpineol acetate.

The epoxy adhesive composition of the present invention may further contain a crosslinking agent, in addition to the polyvinyl acetal resin, the adhesive layer modifier, and the epoxy resin.

Examples of the crosslinking agent include halohydrin compounds, halogen compounds, isocyanate compounds, bisacrylamide compounds, urea compounds, guanidine compounds, dicarboxylic acid compounds, unsaturated carboxylic acid compounds, unsaturated carboxylic acid ester compounds, and aldehyde compounds.

Examples of the halohydrin compounds include epichlorohydrin and epibromohydrin.

Examples of the halogen compounds include 1,2-dichloroethane and 1,3-dichloropropane.

Examples of the isocyanate compounds include hexamethylene diisocyanate.

Examples of the bisacrylamide compounds include N,N'-methylenebisacrylamide and N,N'-ethylenebisacrylamide.

Examples of the urea compounds include urea and thiourea.

Examples of the guanidine compounds include guanidine and diguanide.

Examples of the carboxylic acid compounds include oxalic acid and adipic acid.

Examples of the unsaturated carboxylic acid compounds include acrylic acid and methacrylic acid.

Examples of the unsaturated carboxylic acid ester compounds include methyl acrylate, methyl methacrylate, 2-ethylhexyl acrylate, isobutyl acrylate, butyl acrylate, 2-ethylhexyl methacrylate, isobutyl methacrylate, and butyl methacrylate.

Examples of the aldehyde compounds include dialdehydes such as glyoxal, glutaraldehyde, malonaldehyde, succinaldehyde, adipaldehyde, phthalaldehyde, isophthalaldehyde, and terephthalaldehyde.

Each of these may be used alone or in combination of two or more thereof. These crosslinking agents may be dissolved in water or an organic solvent such as alcohol before use, if needed.

The epoxy adhesive composition of the present invention may further contain a curing agent and a curing accelerator.

Examples of the curing agent include dicyandiamide, imidazole compounds, aromatic amine compounds, phenol novolac resins, and cresol novolac resins. Preferred among these is dicyandiamide.

Examples of the curing accelerator include imidazole compounds, phosphor compounds, amine compounds, and organic metal compounds. Preferred among these are imidazole compounds.

The lower limit of the amount of the curing agent in the epoxy adhesive composition of the present invention per 100 parts by weight of the epoxy resin is preferably 0.5 parts by weight, more preferably 1.0 part by weight and the upper limit thereof is preferably 100 parts by weight, more preferably 50 parts by weight.

The lower limit of the amount of the curing accelerator in the epoxy adhesive composition of the present invention per 100 parts by weight of the epoxy resin is preferably 0.5 parts by weight, more preferably 1.0 part by weight and the upper limit thereof is preferably 30 parts by weight, more preferably 10 parts by weight.

In the epoxy adhesive composition of the present invention, the lower limit of the ratio between the amount of the curing agent and the amount of the curing accelerator (amount of curing agent/amount of curing accelerator) is preferably 1/18, more preferably 1/8 and the upper limit thereof is preferably 1/0.05, more preferably 1/0.125.

The epoxy adhesive composition of the present invention may contain additives such as a plasticizer and a dispersant within a range that the effects of the present invention are not impaired.

As a method for crosslinking of the epoxy adhesive composition of the present invention, a method by heating can be mentioned. In the case of thermally curing the epoxy adhesive composition by heating, the heating temperature is not limited and is preferably 50° C. to 170° C. With the heating temperature of 50° C. or higher, crosslinking can proceed sufficiently to give favorable strength. With the heating temperature of 170° C. or lower, the polyvinyl acetal resin is not thermally degraded to show its properties sufficiently. The lower limit of the heating temperature is more preferably 50° C. and the upper limit thereof is more preferably 160° C.

Though not particularly limited, the lower limit of heating duration is preferably five minutes and the upper limit thereof is preferably ten hours. With the heating duration of five minutes or longer, crosslinking can proceed sufficiently to give sufficient strength. With the heating duration of ten hours or shorter, the polyvinyl acetal resin is not thermally degraded to show its properties sufficiently.

The epoxy adhesive composition of the present invention can be suitably used for applications in which conventional polyvinyl acetal resins have been used. For example, it can be used to obtain coating solutions for producing ceramic molded articles, metal pastes, heat-developing photosensitive materials, coating materials, ink, and reflective sheets. The epoxy adhesive composition of the present invention can be also used as an adhesive such as an adhesive for films used in display devices, an interlayer adhesive for ceramic laminates, a structural adhesive for automobiles and buildings, and an adhesive for electronic materials.

Advantageous Effects of Invention

The present invention can provide an epoxy adhesive composition capable of reducing re-aggregation of an adhesive layer modifier, maintaining favorable viscosity for a long period of time, exhibiting high adhesiveness, and reducing process failures during application of the adhesive.

DESCRIPTION OF EMBODIMENTS

The present invention is more specifically described in the following with reference to, but not limited to, examples.

Example 1

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 400, a degree of saponification of 97.7 mol %, and contained 0.6 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A polyvinyl acetal resin powder was obtained through neutralization, washing with water, and drying by normal methods.

The obtained polyvinyl acetal resin was dissolved in DMSO-$D_6$ (dimethylsulfoxide), and analyzed by $^{13}$C-NMR (nuclear magnetic resonance spectrum) to confirm the presence of the constitutional unit with a carboxyl group represented by the formula (1-4) (amount: 0.6 mol %).

Table 1 shows the acetal group content, the acetyl group content, and the hydroxyl group content measured by $^{13}$C-NMR. The dispersion diameter (D50) of the obtained polyvinyl acetal resin was measured with a particle size distribution analyzer (Malvern Mastersizer 3000, product of Spectris plc).

To 5 g of the obtained polyvinyl acetal resin were added 50 g of an epoxy resin, 15 g of an adhesive layer modifier, 1.5 g of a curing agent, and 1 g of a curing accelerator, thereby preparing an adhesive composition in which a polyvinyl acetal resin and an epoxy resin were blended at a weight ratio of 5:50.

The epoxy resin, adhesive layer modifier, curing agent, and curing accelerator used are listed below.

(Epoxy Resin)

EP-1: bisphenol A-type epoxy resin (jER 828, product of Mitsubishi Chemical Corporation, epoxy equivalent: 190, molecular weight: 370)

EP-2: polypropylene glycol diglycidyl ether (product of Nagase ChemteX Corporation, EX-920, epoxy equivalent: 176)

(Adhesive Layer Modifier)

AM-1: calcium carbonate ($CaCO_3$ (molecular weight: 100.09), product of Shiraishi Kogyo)

(Curing Agent)

CA-1: dicyandiamide (product of Mitsubishi Chemical Corporation, DICY)

(Curing Accelerator)

CA-2: imidazole compound (product of Mitsubishi Chemical Corporation, jER CURE EMT24)

The obtained adhesive composition was applied to a release-treated polyethylene terephthalate (PET) film to have a thickness after drying of 20 μm, followed by drying at 125° C. Thus, a resin sheet was prepared.

Examples 2 to 23

Using the polyvinyl acetal resin obtained in Example 1, adhesive compositions and resin sheets were prepared as in Example 1, except that an epoxy resin, an adhesive layer modifier, a curing agent, and a curing accelerator were added as shown in Table 2.

The adhesive layer modifiers used are listed below.

(Adhesive Layer Modifier)

AM-2: calcium carbonate ($CaCO_3$ (molecular weight: 100.09), product of Shiraishi Kogyo)

AM-3: calcium carbonate ($CaCO_3$ (molecular weight: 100.09), product of Shiraishi Kogyo)

AM-4: silica ($SiO_2$ (molecular weight: 60.08), product of Nippon Aerosil Co., Ltd.)

AM-5: silica ($SiO_2$ (molecular weight: 60.08), product of Nippon Aerosil Co., Ltd.)

AM-6: silica ($SiO_2$ (molecular weight: 60.08), product of Nippon Aerosil Co., Ltd.)

AM-7: barium sulphate ($BaSO_4$ (molecular weight: 233.38), product of Sakai Chemical Industry Co., Ltd.)

AM-8: barium sulphate ($BaSO_4$ (molecular weight: 233.38), product of Sakai Chemical Industry Co., Ltd.)

AM-9: barium sulphate ($BaSO_4$ (molecular weight: 233.38), product of Sakai Chemical Industry Co., Ltd.)

AM-10: talc ($3MgO \cdot 4SiO_2 \cdot H_2O$ (molecular weight: 379.27), product of Fuji Talc Industrial Co., Ltd.)

AM-11: talc ($3MgO \cdot 4SiO_2 \cdot H_2O$ (molecular weight 379.27), product of Fuji Talc Industrial Co., Ltd.)

AM-12: talc ($3MgO \cdot 4SiO_2 \cdot H_2O$ (molecular weight 379.27), product of Fuji Talc Industrial Co., Ltd.)

AM-13: titanium oxide ($TiO_2$ (molecular weight: 79.87), product of Chemours Company)

AM-14: titanium oxide ($TiO_2$ (molecular weight: 79.87), product of Chemours Company) AM-15: titanium oxide ($TiO_2$ (molecular weight: 79.87), product of Chemours Company)

AM-16: aluminum oxide ($Al_2O_3$ (molecular weight: 101.96), product of Nippon Light Metal Co., Ltd.)

AM-17: aluminum oxide ($Al_2O_3$ (molecular weight: 101.96), product of Nippon Light Metal Co., Ltd.)

AM-18: aluminum oxide ($Al_2O_3$ (molecular weight: 101.96), product of Nippon Light Metal Co., Ltd.)

AM-19: calcium oxide (CaO (molecular weight: 56.08), product of Okutama Kogyo Co., Ltd.)

AM-20: calcium oxide (CaO (molecular weight: 56.08), product of Okutama Kogyo Co., Ltd.)

AM-21: calcium oxide (CaO (molecular weight: 56.08), product of Okutama Kogyo Co., Ltd.)

The dispersion diameters of the adhesive layer modifiers were measured with a particle size distribution analyzer (Malvern Mastersizer 3000, product of Spectris plc). The BET specific surface areas of the adhesive layer modifiers were measured with a specific surface area measuring device (ASAP-2000, product of Shimadzu Corporation). The bulk densities of the adhesive layer modifiers were measured with a powder tester (powder tester PT-X, product of Hosokawa Micron Corporation). The water contents of the adhesive layer modifiers were measured with a thermogravimetric analyzer (TG/DTA7300, product of Hitachi High-Tech Science Corporation). Table 2 shows the results.

The adhesive layer modifiers were each dispersed in pure water and the dispersion diameter thereof in pure water was determined. No shrinkage of the dispersion diameter was observed in the cases of calcium carbonate, silica, barium sulphate, talc, titanium oxide, and aluminum oxide. Shrinkage of the dispersion diameter was observed in the case of calcium oxide.

Example 24

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 800 and a degree of saponification of 98.0 mol %, and contained 0.6 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A polyvinyl acetal resin powder was obtained by neutralization, washing with water, and drying by normal methods.

The obtained polyvinyl acetal resin was dissolved in DMSO-$d_6$ (dimethylsulfoxide), and analyzed by $^{13}$C-NMR (nuclear magnetic resonance spectrum) to determine the acetal group content, the acetyl group content, the hydroxyl group content, and the amount of the constitutional unit with an acid-modified group. Table 1 shows the results.

An adhesive composition and a resin sheet were prepared as in Example 1, except that the obtained polyvinyl acetal resin was used and an epoxy resin, an adhesive layer modifier, a curing agent, and a curing accelerator were added as shown in Table 1.

Example 25

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 400 and a degree of saponification of 89.0 mol %, and contained 0.5 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A polyvinyl acetal resin powder was obtained through neutralization, washing with water, and drying by normal methods.

The obtained polyvinyl acetal resin was dissolved in DMSO-$d_6$ (dimethylsulfoxide), and analyzed by $^{13}$C-NMR (nuclear magnetic resonance spectrum) to determine the acetal group content, the acetyl group content, the hydroxyl group content, and the amount of the constitutional unit with an acid-modified group. Table 1 shows the results.

An adhesive composition and a resin sheet were prepared as in Example 1, except that the obtained polyvinyl acetal resin was used and an epoxy resin, an adhesive layer modifier, a curing agent, and a curing accelerator were added as shown in Table 2.

Example 26

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 50 g of acetaldehyde, and 50 g of butyraldehyde. The acetalization reaction was carried out to precipitate a reaction product by maintaining the solution temperature at 40° C.

The polyvinyl alcohol used had a degree of polymerization of 400 and a degree of saponification of 97.6 mol %, and contained 2.0 mol % of a constitutional unit with a carboxyl group represented by the formula (1-4) (in the formula (1-4), $R^6$ represents a single bond, $X^6$ represents a hydrogen atom, $R^1$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained polyvinyl acetal resin was dissolved in DMSO-$d_6$ (dimethylsulfoxide), and analyzed by $^{13}$C-NMR (nuclear magnetic resonance spectrum) to determine the acetal group content, the acetyl group content, the hydroxyl group content, and the amount of the constitutional unit with an acid-modified group.

An adhesive composition and a resin sheet were prepared as in Example 1, except that the obtained polyvinyl acetal resin was used and an epoxy resin, an adhesive layer modifier, a curing agent, and a curing accelerator were added as shown in Table 2.

Example 27

An amount of 200 g of polyvinyl alcohol were added to 1,800 g of pure water, and stirred at 90° C. for about two hours to be dissolved. The solution was cooled to 40° C., and to the solution were added 150 g of hydrochloric acid having a concentration of 35% by weight and 75 g of formaldehyde. The acetalization reaction was carried out to precipitate a reaction product by maintaining the solution temperature at 40° C.

The polyvinyl alcohol used was the same as that used in Example 1.

Then, the reaction solution was held to maintain the temperature at 40° C. for three hours, thereby completing the reaction. A modified polyvinyl acetal resin powder was obtained through neutralization, washing with water, and drying by normal methods.

The obtained polyvinyl acetal resin was dissolved in DMSO-$d_6$ (dimethylsulfoxide), and analyzed by $^{13}$C-NMR (nuclear magnetic resonance spectrum) to determine the acetal group content, the acetyl group content, the hydroxyl group content, and the amount of the constitutional unit with an acid-modified group.

An adhesive composition and a resin sheet were prepared as in Example 1, except that the obtained polyvinyl acetal resin was used and an epoxy resin, an adhesive layer modifier, a curing agent, and a curing accelerator were added as shown in Table 2.

Example 28

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 400 and a degree of saponification of 97.7 mol %, and contained 0.6 mold of a constitutional unit with a carboxyl group represented by the formula (1-3) (in the formula (1-3), $R^4$ represents a single bond, $X^4$ represents a hydrogen atom, $R^5$ represents a single bond, $X^5$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained polyvinyl acetal resin was dissolved in DMSO-$d_6$ (dimethylsulfoxide), and analyzed by $^{13}$C-NMR (nuclear magnetic resonance spectrum) to determine the acetal group content, the acetyl group content, the hydroxyl group content, and the amount of the constitutional unit with an acid-modified group. Table 1 shows the results.

An adhesive composition and a resin sheet were prepared as in Example 1, except that the obtained polyvinyl acetal resin was used and an epoxy resin, an adhesive layer modifier, a curing agent, and a curing accelerator were added as shown in Table 2.

Example 29

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 400 and a degree of saponification of 97.7 mol %, and contained 0.6 mol % of a constitutional unit with a sulfonic acid group represented by the formula (2-1) (in the formula (2-1), $R^1$ represents a single bond and $X^1$ represents a sodium atom).

Then, the reaction solution was held to maintain the temperature at 40° C. for three hours, thereby completing the reaction. A polyvinyl acetal resin powder was obtained through neutralization, washing with water, and drying by normal methods.

The obtained polyvinyl acetal resin was dissolved in DMSO-$d_6$ (dimethylsulfoxide), and analyzed by $^{13}$C-NMR (nuclear magnetic resonance spectrum) to determine the acetal group content, the acetyl group content, the hydroxyl group content, and the amount of the constitutional unit with an acid-modified group. Table 1 shows the results.

An adhesive composition and a resin sheet were prepared as in Example 1, except that the obtained polyvinyl acetal resin was used and an epoxy resin, an adhesive layer modifier, a curing agent, and a curing accelerator were added as shown in Table 2.

Example 30

Using the polyvinyl acetal resin obtained in Example 1, an adhesive composition and a resin sheet were prepared as in Example 1, except that an epoxy resin, an adhesive layer modifier, a curing agent, and a curing accelerator were added as shown in Table 2.

The epoxy resin used instead of EP-1 is mentioned below.
(Epoxy Resin)
EP-3: bisphenol F-type epoxy resin (product of Mitsubishi Chemical Corporation, jER 807, epoxy equivalent: 170)

Comparative Example 1

Using the polyvinyl acetal resin obtained in Example 1, an adhesive composition and a resin sheet were prepared as in Example 1, except that an epoxy resin, a curing agent, and a curing accelerator were added as shown in Table 2.

Comparative Example 2

Using the polyvinyl acetal resin obtained in Example 1, an adhesive composition and a resin sheet were prepared as in Example 1, except that an adhesive layer modifier, a curing agent, and a curing accelerator were added as shown in Table 2. However, no test sample that can be subjected to the following evaluations was obtained.

Comparative Examples 3 to 23

Adhesive compositions and resin sheets were prepared as in Example 1, except that an epoxy resin, an adhesive layer modifier, a curing agent, and a curing accelerator were added as shown in Table 2.

<Evaluation>

The following evaluations were performed on the adhesive compositions and resin sheets obtained in the examples and comparative examples. Table 3 shows the results.
(1) Viscosity Evaluation Using a cone-plate viscometer, the viscosity of the obtained adhesive composition right after the preparation thereof was measured at a shear rate of 100 s$^{-1}$.
(2) Evaluation of Dispersion Stability The adhesive composition was poured into a screw-top test tube NS-10 produced by Maruemu Corporation to the height of 7 cm from the bottom of the test tube, and stored at 50° C. for 12 hours and 24 hours. After storage of each time, the dispersion state of the adhesive layer modifier in the solution sample was observed and evaluated based on the following criteria.

∘∘ (Excellent): Completely dispersed without sedimentation.

∘ (Good): Sedimentation volume of not more than 1.0 mm.

Δ (Fair): Sedimentation volume of more than 1.0 mm but not more than 3.5 mm.

x (Poor): Sedimentation volume of more than 3.5 mm.

The "sedimentation volume" as used herein refers to the distance between the liquid surface and the phase interface in the phase-separated adhesive composition.
(3) Evaluation of Permeation to Base Material A drop of the obtained adhesive composition was put on a base material ("BEMCOT M-3II", product of Asahi Kasei Corporation), and after standing for two minutes, the permeation state of the droplet was evaluated based on the following criteria.

∘∘ (Excellent): The droplet hardly permeated and was left on the base material.

∘ (Good): The droplet slightly permeated but was mostly left on the base material.

x (Poor): The droplet mostly permeated and was hardly left on the base material.
(4) Gel Fraction To about 0.1 g (w1) of a resin sheet sample was added 40 g of a solvent mixture (weight ratio of 1:1) of toluene and ethanol, and stirred for 24 hours so that the sample was dissolved again. The solid-liquid separation was performed using a 200-mesh stainless steel sieve whose mass was measured in advance. Then, the stainless steel sieve was taken out, and vacuum dried at 100° C. for one hour. The mass (w3) of the sieve was measured, and the gel fraction was calculated using the following equation.

$$\text{Gel fraction (\%)} = \{(w3-w2)/w1\} \times 100$$

The obtained gel fraction was evaluated based on the following criteria.

A higher gel fraction indicates better curability.

∘∘ (Excellent): 80% or higher

∘ (Good): 40% or higher but lower than 80%

Δ (Fair): 10% or higher but lower than 40% x (Poor): Lower than 10%
(5) Tensile modulus of elasticity, degree of elongation, yield point stress The obtained resin sheet was peeled from the PET film. The tensile modulus of elasticity (MPa), degree of elongation (%), and yield point stress (MPa) of the peeled sheet were measured at a tensile speed of 20 mm/min. using an AUTOGRAPH (AGS-J, product of Shimadzu Corporation) by a method in conformity with JIS K 7113.
(6) Shear Adhesive Force The obtained adhesive composition was applied to various metal base materials, cured by heating at 170° C. for 30 minutes, and subjected to measurement of the shear adhesive force by a method in conformity with JIS K 6850 at a measuring temperature of 20° C. at a tensile speed of 5 mm/min.

The metal base materials used were aluminum, stainless steel (SUS304), and SPCC plates.

When the shear adhesive force is high, the cured adhesive composition is less likely to be peeled under application of an external force, showing excellent adhesive force.

(7) Peel Adhesive Force

By a method in conformity with JIS K 6854-3, the obtained adhesive composition was applied to two SPCC plates to bond the SPCC plates, the workpiece was heated at 170° C. for 30 minutes to cure the adhesive composition, and the peel adhesive force was measured at a peel angle of 180 degrees at a peel rate of 200 mm/min.

A measurement sample prepared in the same manner was stored in an environment of 85° C. and 85% RH for 168 hours. Then, the peel adhesive force was measured at a peel angle of 180 degrees and a peel rate of 200 mm/min.

(8) Impact Resistance

The obtained adhesive composition was poured into a mold and heated at 170° C. for 30 minutes. Thus, a resin cured product was obtained. The obtained resin cured product was subjected to a Charpy impact test using a digital impact tester DS-UB (product of Toyo Seiki Seisakusho, Ltd.) by a method in conformity with JIS K 7111. Thus, the Charpy impact value upon breakage of the resin cured product was measured to evaluate the impact resistance.

(9) Cold Resistance

The obtained adhesive composition was poured into a mold and heated at 170° C. for 30 minutes. Thus, a resin cured product was obtained. The obtained resin cured product was subjected to a destructive test at −45° C. using a brittle point tester type S (product of Toyo Seiki Seisakusho, Ltd.) by a method in conformity with JIS K 7216. The test was performed on ten samples and the number of samples broken in the test was determined to evaluate the cold resistance. When the number of broken samples is smaller, the cold resistance is higher.

(10) Nozzle Clogging Test

The obtained adhesive composition was stored at 50° C. Then, 10 ml of the adhesive composition was charged into a disposable syringe SS-10LZ (product of Terumo Corporation) with a luer-lock syringe nozzle (nozzle bore diameter: 0.16 mm) mounted thereon, and ejected at 1 ml/sec. The storage time when the adhesive composition clogged the nozzle and failed to be ejected therefrom was determined.

TABLE 1

| | Polyvinyl acetal resin | | | | | | | | |
|---|---|---|---|---|---|---|---|---|---|
| | Degree of polymerization | Acetoacetal group content (mol %) | Butyral group content (mol %) | Formal group content (mol %) | Acetyl group content (mol %) | Hydroxyl group content (mol %) | Amount of constitutional unit with acid-modified group (mol %) | Acid-modified group equivalent | Molecular weight | Dispersion diameter D50 (μm) |
| Example 1 | 400 | 71.4 | — | — | 2.3 | 25.7 | 0.6 | 4569.0 | 21931.3 | 53 |
| Example 2 | 400 | 71.4 | — | — | 2.3 | 25.7 | 0.6 | 4569.0 | 21931.3 | 53 |
| Example 3 | 400 | 71.4 | — | — | 2.3 | 25.7 | 0.6 | 4569.0 | 21931.3 | 53 |
| Example 4 | 400 | 71.4 | — | — | 2.3 | 25.7 | 0.6 | 4569.0 | 21931.3 | 53 |
| Example 5 | 400 | 71.4 | — | — | 2.3 | 25.7 | 0.6 | 4569.0 | 21931.3 | 53 |
| Example 6 | 400 | 71.4 | — | — | 2.3 | 25.7 | 0.6 | 4569.0 | 21931.3 | 53 |
| Example 7 | 400 | 71.4 | — | — | 2.3 | 25.7 | 0.6 | 4569.0 | 21931.3 | 53 |
| Example 8 | 400 | 71.4 | — | — | 2.3 | 25.7 | 0.6 | 4569.0 | 21931.3 | 53 |
| Example 9 | 400 | 71.4 | — | — | 2.3 | 25.7 | 0.6 | 4569.0 | 21931.3 | 53 |
| Example 10 | 400 | 71.4 | — | — | 2.3 | 25.7 | 0.6 | 4569.0 | 21931.3 | 53 |
| Example 11 | 400 | 71.4 | — | — | 2.4 | 25.7 | 0.6 | 4569.0 | 21931.3 | 53 |
| Example 12 | 400 | 71.4 | — | — | 2.3 | 25.7 | 0.6 | 4569.0 | 21931.3 | 53 |
| Example 13 | 400 | 71.4 | — | — | 2.3 | 25.7 | 0.6 | 4569.0 | 21931.3 | 53 |
| Example 14 | 400 | 71.4 | — | — | 2.3 | 25.7 | 0.6 | 4569.0 | 21931.3 | 53 |
| Example 15 | 400 | 71.4 | — | — | 2.3 | 25.7 | 0.6 | 4569.0 | 21931.3 | 53 |
| Example 16 | 400 | 71.4 | — | — | 2.3 | 25.7 | 0.6 | 4569.0 | 21931.3 | 53 |
| Example 17 | 400 | 71.4 | — | — | 2.3 | 25.7 | 0.6 | 4569.0 | 21931.3 | 53 |
| Example 18 | 400 | 71.4 | — | — | 2.4 | 25.7 | 0.6 | 4569.0 | 21931.3 | 53 |
| Example 19 | 400 | 71.4 | — | — | 2.4 | 25.7 | 0.6 | 4569.0 | 21931.3 | 53 |
| Example 20 | 400 | 71.4 | — | — | 2.3 | 25.7 | 0.6 | 4569.0 | 21931.3 | 53 |
| Example 21 | 400 | 71.4 | — | — | 2.3 | 25.7 | 0.6 | 4569.0 | 21931.3 | 53 |
| Example 22 | 400 | 71.4 | — | — | 2.4 | 25.7 | 0.6 | 4569.0 | 21931.3 | 53 |
| Example 23 | 400 | 71.4 | — | — | 2.4 | 25.7 | 0.6 | 4569.0 | 21931.3 | 53 |
| Example 24 | 800 | 72.7 | — | — | 2.0 | 24.7 | 0.6 | 2286.3 | 21948.3 | 45 |
| Example 25 | 400 | 61.4 | — | — | 11.0 | 27.1 | 0.5 | 5710.1 | 22840.5 | 44 |
| Example 26 | 400 | 42.0 | 28.0 | — | 2.4 | 25.8 | 2.0 | 1495.7 | 23930.8 | 52 |
| Example 27 | 400 | — | — | 71.6 | 2.3 | 25.5 | 0.6 | 4153.5 | 19936.9 | 56 |
| Example 28 | 400 | — | — | — | 2.3 | 25.7 | 0.6 | 4562.0 | 21897.7 | 53 |
| Example 29 | 400 | 71.4 | — | — | 2.4 | 25.7 | 0.6 | 9138.1 | 21931.3 | 53 |
| Example 30 | 400 | 71.4 | — | — | 2.4 | 25.7 | 0.6 | 4569.0 | 21931.3 | 53 |
| Comparative Example 1 | 400 | 71.4 | — | — | 2.4 | 25.7 | 0.6 | 4569.0 | 21931.3 | 53 |
| Comparative Example 2 | 400 | 71.4 | — | — | 2.4 | 25.7 | 0.6 | 4569.0 | 21931.3 | 53 |
| Comparative Example 3 | — | — | — | — | — | — | — | — | — | — |
| Comparative Example 4 | — | — | — | — | — | — | — | — | — | — |
| Comparative Example 5 | — | — | — | — | — | — | — | — | — | — |

TABLE 1-continued

| | Polyvinyl acetal resin | | | | | | | | |
|---|---|---|---|---|---|---|---|---|---|
| | Degree of polymerization | Acetoacetal group content (mol %) | Butyral group content (mol %) | Formal group content (mol %) | Acetyl group content (mol %) | Hydroxyl group content (mol %) | Amount of constitutional unit with acid-modified group (mol %) | Acid-modified group equivalent | Molecular weight | Dispersion diameter D50 (μm) |
| Comparative Example 6 | — | — | — | — | — | — | — | — | — | — |
| Comparative Example 7 | — | — | — | — | — | — | — | — | — | — |
| Comparative Example 8 | — | — | — | — | — | — | — | — | — | — |
| Comparative Example 9 | — | — | — | — | — | — | — | — | — | — |
| Comparative Example 10 | — | — | — | — | — | — | — | — | — | — |
| Comparative Example 11 | — | — | — | — | — | — | — | — | — | — |
| Comparative Example 12 | — | — | — | — | — | — | — | — | — | — |
| Comparative Example 13 | — | — | — | — | — | — | — | — | — | — |
| Comparative Example 14 | — | — | — | — | — | — | — | — | — | — |
| Comparative Example 15 | — | — | — | — | — | — | — | — | — | — |
| Comparative Example 16 | — | — | — | — | — | — | — | — | — | — |
| Comparative Example 17 | — | — | — | — | — | — | — | — | — | — |
| Comparative Example 18 | — | — | — | — | — | — | — | — | — | — |
| Comparative Example 19 | — | — | — | — | — | — | — | — | — | — |
| Comparative Example 20 | — | — | — | — | — | — | — | — | — | — |
| Comparative Example 21 | — | — | — | — | — | — | — | — | — | — |
| Comparative Example 22 | — | — | — | — | — | — | — | — | — | — |
| Comparative Example 23 | — | — | — | — | — | — | — | — | — | — |

TABLE 2

| | Adhesive composition | | | | | | | | |
|---|---|---|---|---|---|---|---|---|---|
| | | Epoxy resin | | | | Adhesive layer modifier | | | |
| | Polyvinyl acetal resin (g) | EP-1 (g) | EP-2 (g) | EP-3 (g) | Epoxy equivalent | Type | Molecular weight | Dispersion diameter (μm) D10 | D50 | D90 |
| Example 1 | 5 | 45 | 5 | — | 188.6 | AM-1 | 100.09 | 0.2 | 0.55 | 1.1 |
| Example 2 | 5 | 45 | 5 | — | 188.6 | AM-2 | 100.09 | 0.7 | 5.5 | 16 |
| Example 3 | 5 | 45 | 5 | — | 188.6 | AM-3 | 100.09 | 1.2 | 1.1 | 25 |
| Example 4 | 5 | 45 | 5 | — | 188.6 | AM-4 | 60.08 | 0.06 | 0.3 | 0.6 |
| Example 5 | 5 | 45 | 5 | — | 188.6 | AM-5 | 60.08 | 3 | 14 | 19 |
| Example 6 | 5 | 45 | 5 | — | 188.6 | AM-6 | 60.08 | 15 | 23 | 29 |
| Example 7 | 5 | 45 | 5 | — | 188.6 | AM-7 | 233.38 | 0.08 | 0.5 | 1.2 |
| Example 8 | 5 | 45 | 5 | — | 188.6 | AM-8 | 233.38 | 9 | 21 | 35 |
| Example 9 | 5 | 45 | 5 | — | 188.6 | AM-9 | 233.38 | 18 | 52 | 63 |
| Example 10 | 5 | 45 | 5 | — | 188.6 | AM-10 | 379.27 | 0.09 | 1.2 | 3.5 |
| Example 11 | 5 | 45 | 5 | — | 188.6 | AM-11 | 379.27 | 0.4 | 4 | 23 |
| Example 12 | 5 | 45 | 5 | — | 188.6 | AM-12 | 379.27 | 92 | 45 | 60 |
| Example 13 | 5 | 45 | 5 | — | 188.6 | AM-13 | 79.87 | 0.1 | 0.23 | 0.5 |
| Example 14 | 5 | 45 | 5 | — | 188.6 | AM-14 | 79.87 | 0.7 | 2.6 | 5.6 |
| Example 15 | 5 | 45 | 5 | — | 188.6 | AM-15 | 79.87 | 1.1 | 42 | 57 |
| Example 16 | 5 | 45 | 5 | — | 188.6 | AM-16 | 101.96 | 1.4 | 7.4 | 13.8 |
| Example 17 | 5 | 45 | 5 | — | 188.6 | AM-17 | 101.96 | 5.5 | 16 | 23 |
| Example 18 | 5 | 45 | 5 | — | 188.6 | AM-18 | 101.96 | 16 | 55 | 69 |
| Example 19 | 5 | 45 | 5 | — | 188.6 | AM-19 | 56.08 | 0.3 | 1.5 | 10.5 |
| Example 20 | 5 | 45 | 5 | — | 188.6 | AM-20 | 56.08 | 1.4 | 4.9 | 11.3 |
| Example 21 | 5 | 45 | 5 | — | 188.6 | AM-21 | 56.08 | 9.2 | 22 | 96 |
| Example 22 | 5 | 45 | 5 | — | 188.6 | AM-2 | 100.09 | 0.7 | 5.5 | 16 |

TABLE 2-continued

| | | | | | | | | | | |
|---|---|---|---|---|---|---|---|---|---|---|
| Example 23 | 5 | 45 | 5 | — | 188.6 | | 100.09 | 0.7 | 5.5 | 16 |
| Example 24 | 5 | 45 | 5 | — | 188.6 | | 100.09 | 0.7 | 5.5 | 16 |
| Example 25 | 5 | 45 | 5 | — | 188.6 | | 100.09 | 0.7 | 5.5 | 16 |
| Example 26 | 5 | 45 | 5 | — | 188.6 | | 100.09 | 0.7 | 5.5 | 16 |
| Example 27 | 5 | 45 | 5 | — | 188.6 | | 100.09 | 0.7 | 5.5 | 16 |
| Example 28 | 5 | 45 | 5 | — | 188.6 | | 100.09 | 0.7 | 5.5 | 16 |
| Example 29 | 5 | 45 | 5 | — | 188.6 | | 100.09 | 0.7 | 5.5 | 16 |
| Example 30 | 5 | — | 5 | 45 | 170.6 | | 100.09 | 0.7 | 5.5 | 16 |
| Comparative Example 1 | 5 | 45 | 5 | — | 188.6 | — | — | — | — | — |
| Comparative Example 2 | 5 | — | — | — | — | AM-2 | 100.09 | 0.7 | 5.5 | 16 |
| Comparative Example 3 | — | 45 | 5 | — | 188.6 | AM-1 | 100.09 | 0.2 | 0.55 | 1.1 |
| Comparative Example 4 | — | 45 | 5 | — | 188.6 | AM-2 | 100.09 | 0.7 | 5.5 | 16 |
| Comparative Example 5 | — | 45 | 5 | — | 188.6 | AM-3 | 100.09 | 1.2 | 11 | 25 |
| Comparative Example 6 | — | 45 | 5 | — | 188.6 | AM-4 | 60.08 | 0.06 | 0.3 | 0.6 |
| Comparative Example 7 | — | 45 | 5 | — | 188.6 | AM-5 | 60.08 | 3 | 14 | 19 |
| Comparative Example 8 | — | 45 | 5 | — | 188.6 | AM-6 | 60.08 | 15 | 23 | 29 |
| Comparative Example 9 | — | 45 | 5 | — | 188.6 | AM-7 | 233.38 | 0.08 | 0.5 | 1.2 |
| Comparative Example 10 | — | 45 | 5 | — | 188.6 | AM-8 | 233.38 | 9 | 21 | 35 |
| Comparative Example 11 | — | 45 | 5 | — | 188.6 | AM-9 | 233.38 | 18 | 52 | 53 |
| Comparative Example 12 | — | 45 | 5 | — | 188.6 | AM-10 | 379.27 | 0.09 | 1.2 | 3.5 |
| Comparative Example 13 | — | 45 | 5 | — | 188.6 | AM-11 | 379.27 | 0.4 | 4 | 23 |
| Comparative Example 14 | — | 45 | 5 | — | 188.6 | AM-12 | 379.37 | 9 | 45 | 60 |
| Comparative Example 15 | — | 45 | 5 | — | 188.6 | AM-13 | 79.87 | 0.1 | 0.22 | 0.5 |
| Comparative Example 16 | — | 45 | 5 | — | 188.6 | AM-14 | 79.87 | 0.7 | 2.6 | 5.6 |
| Comparative Example 17 | — | 45 | 5 | — | 188.6 | AM-15 | 79.87 | 11 | 42 | 57 |
| Comparative Example 18 | — | 45 | 5 | — | 188.6 | AM-16 | 101.96 | 1.6 | 7.4 | 13.8 |
| Comparative Example 19 | — | 45 | 5 | — | 188.6 | AM-17 | 101.96 | 5.5 | 16 | 23 |
| Comparative Example 20 | — | 45 | 5 | — | 188.6 | AM-18 | 101.96 | 16 | 55 | 68 |
| Comparative Example 21 | — | 45 | 5 | — | 188.6 | AM-19 | 56.08 | 0.3 | 1.5 | 10.5 |
| Comparative Example 22 | — | 45 | 5 | — | 188.6 | AM-20 | 56.08 | 1.4 | 4.9 | 11.3 |
| Comparative Example 23 | — | 45 | 5 | — | 188.6 | AM-21 | 56.08 | 9.2 | 22 | 56 |

| | Adhesive composition |||||||
|---|---|---|---|---|---|---|---|
| | Adhesive layer modifier ||| | | | |
| | BET specific surface area ($m^2/g$) | Bulk density ($g/cm^2$) | Water content ($g/cm^2$) | Amount (g) | Curing agent (g) CA-1 | Curing accelerator (g) CA-2 | Acid-modified group equivalent/ apoxy group equivalent | Acid-modified group number/ epoxy group number |
|---|---|---|---|---|---|---|---|---|
| Example 1 | 11.5 | 0.17 | 0.15 | 15 | 1.5 | 1 | 24.2 | 0.00413 |
| Example 2 | 1.1 | 0.85 | 0.17 | 15 | 1.5 | 1 | 24.2 | 0.00413 |
| Example 3 | 2 | 1.1 | 0.14 | 15 | 1.5 | 1 | 24.2 | 0.00413 |
| Example 4 | 15 | 0.56 | 0.22 | 15 | 1.5 | 1 | 24.2 | 0.00413 |
| Example 5 | 2 | 0.34 | 0.25 | 15 | 1.5 | 1 | 24.2 | 0.00413 |
| Example 6 | 2 | 0.35 | 0.21 | 15 | 1.5 | 1 | 24.2 | 0.00413 |
| Example 7 | 14 | 1.5 | 0.15 | 15 | 1.5 | 1 | 24.2 | 0.00413 |
| Example 8 | 0.3 | 1.8 | 0.12 | 15 | 1.5 | 1 | 24.2 | 0.00413 |
| Example 9 | 0.02 | 2.1 | 0.13 | 15 | 1.5 | 1 | 24.2 | 0.00413 |
| Example 10 | 40 | 0.12 | 0.21 | 15 | 1.5 | 1 | 24.2 | 0.00413 |
| Example 11 | 10.5 | 0.13 | 0.2 | 15 | 1.5 | 1 | 24.2 | 0.00413 |
| Example 12 | 35 | 0.12 | 0.17 | 15 | 1.5 | 1 | 24.2 | 0.00413 |
| Example 13 | 21 | 1.65 | 0.16 | 15 | 1.5 | 1 | 24.2 | 0.00413 |

TABLE 2-continued

|  |  |  |  |  |  |  |  |  |
|---|---|---|---|---|---|---|---|---|
| Example 14 | 9 | 0.91 | 0.14 | 15 | 1.5 | 1 | 24.2 | 0.00413 |
| Example 15 | 0.05 | 1.1 | 0.19 | 15 | 1.5 | 1 | 24.2 | 0.00413 |
| Example 16 | 0.6 | 1.5 | 0.2 | 15 | 1.5 | 1 | 24.2 | 0.00413 |
| Example 17 | 0.3 | 1.7 | 0.23 | 15 | 1.5 | 1 | 24.2 | 0.00413 |
| Example 18 | 3.5 | 0.9 | 2.4 | 15 | 1.5 | 1 | 24.2 | 0.00413 |
| Example 19 | 1.2 | 0.13 | 2.5 | 15 | 1.5 | 1 | 24.2 | 0.00413 |
| Example 20 | 1.1 | 0.57 | 2.9 | 15 | 1.5 | 1 | 24.2 | 0.00413 |
| Example 21 | 0.09 | 1.64 | 0.17 | 15 | 1.5 | 1 | 24.2 | 0.00413 |
| Example 22 | 1.1 | 0.85 | 0.17 | 3.5 | 1.5 | 1 | 24.2 | 0.00413 |
| Example 23 | 1.1 | 0.85 | 0.17 | 32 | 1.5 | 1 | 24.2 | 0.00413 |
| Example 24 | 1.1 | 0.85 | 0.17 | 15 | 1.5 | 1 | 24.2 | 0.00412 |
| Example 25 | 1.1 | 0.85 | 0.17 | 15 | 1.5 | 1 | 30.3 | 0.00330 |
| Example 26 | 1.1 | 0.85 | 0.17 | 15 | 1.5 | 1 | 1.9 | 0.01260 |
| Example 27 | 1.1 | 0.85 | 0.17 | 15 | 1.5 | 1 | 22.0 | 0.00454 |
| Example 28 | 1.1 | 0.85 | 0.17 | 15 | 1.5 | 1 | 24.2 | 0.00413 |
| Example 29 | 1.1 | 0.85 | 0.17 | 15 | 1.5 | 1 | 48.5 | 0.00206 |
| Example 30 | 1.1 | 0.85 | 0.17 | 15 | 1.5 | 1 | 26.8 | 0.00373 |
| Comparative Example 1 | — | — | — | — | 1.5 | 1 | 24.2 | 0.00413 |
| Comparative Example 2 | 1.1 | 0.85 | 0.17 | 15 | 1.5 | 1 | — | — |
| Comparative Example 3 | 11.5 | 0.17 | 0.15 | 15 | 1.5 | 1 | — | — |
| Comparative Example 4 | 1.1 | 0.85 | 0.17 | 15 | 1.5 | 1 | — | — |
| Comparative Example 5 | 2 | 1.1 | 0.14 | 15 | 1.5 | 1 | — | — |
| Comparative Example 6 | 15 | 0.56 | 0.22 | 15 | 1.5 | 1 | — | — |
| Comparative Example 7 | 2 | 0.34 | 0.25 | 15 | 1.5 | 1 | — | — |
| Comparative Example 8 | 2 | 0.35 | 0.21 | 15 | 1.5 | 1 | — | — |
| Comparative Example 9 | 14 | 1.5 | 0.15 | 15 | 1.5 | 1 | — | — |
| Comparative Example 10 | 0.3 | 1.9 | 0.12 | 15 | 1.5 | 1 | — | — |
| Comparative Example 11 | 0.02 | 2.1 | 0.13 | 15 | 1.5 | 1 | — | — |
| Comparative Example 12 | 40 | 0.12 | 0.21 | 15 | 1.5 | 1 | — | — |
| Comparative Example 13 | 10.5 | 0.13 | 0.2 | 15 | 1.5 | 1 | — | — |
| Comparative Example 14 | 35 | 0.12 | 0.22 | 15 | 1.5 | 1 | — | — |
| Comparative Example 15 | 21 | 1.65 | 0.17 | 15 | 1.5 | 1 | — | — |
| Comparative Example 16 | 2 | 0.91 | 0.16 | 15 | 1.5 | 1 | — | — |
| Comparative Example 17 | 0.05 | 1.1 | 0.14 | 15 | 1.5 | 1 | — | — |
| Comparative Example 18 | 0.6 | 1.5 | 0.18 | 15 | 1.5 | 1 | — | — |
| Comparative Example 19 | 0.3 | 1.7 | 0.2 | 15 | 1.5 | 1 | — | — |
| Comparative Example 20 | 3.5 | 0.9 | 0.23 | 15 | 1.5 | 1 | — | — |
| Comparative Example 21 | 1.2 | 0.13 | 2.4 | 15 | 1.5 | 1 | — | — |
| Comparative Example 22 | 1.1 | 0.57 | 2.6 | 15 | 1.5 | 1 | — | — |
| Comparative Example 23 | 0.09 | 1.54 | 2.9 | 15 | 1.5 | 1 | — | — |

TABLE 3

| | Evaluation | | | | | | | |
|---|---|---|---|---|---|---|---|---|
| | | Dispersion stability | | | | Composition strength | | Shear |
| | Viscosity (Pa · s) | After storage at 50° C. for 12 hrs | After storage at 50° C. for 24 hrs | Permeation to base material | Gel fraction | Tensile modulus of elasticity (Mpa) | Degree of elongation (%) | Yield point stress (Mps) | adhesive force (Mpa) Aluminum |
| Example 1 | 2.1 | ∘∘ | ∘∘ | ∘ | ∘∘ | 1280 | 42 | 93 | 18.5 |
| Example 2 | 1.3 | ∘∘ | ∘∘ | ∘ | ∘∘ | 1200 | 40 | 90 | 18.4 |

TABLE 3-continued

| | | | | | | | | | |
|---|---|---|---|---|---|---|---|---|---|
| Example 3 | 1.6 | ○○ | ○○ | ○ | ○○ | 1180 | 39 | 92 | 18.1 |
| Example 4 | 5.1 | ○○ | ○○ | ○ | ○○ | 1270 | 43 | 88 | 18.9 |
| Example 5 | 4.6 | ○○ | ○○ | ○ | ○○ | 1230 | 41 | 89 | 18.8 |
| Example 6 | 4.2 | ○○ | ○○ | ○ | ○○ | 1230 | 40 | 91 | 18.1 |
| Example 7 | 5.3 | ○○ | ○○ | ○ | ○○ | 1220 | 43 | 91 | 18.4 |
| Example 8 | 4.7 | ○○ | ○○ | ○ | ○○ | 1210 | 41 | 89 | 18.2 |
| Example 9 | 4.0 | ○○ | ○○ | ○ | ○○ | 1220 | 41 | 90 | 18 |
| Example 10 | 2.1 | ○○ | ○○ | ○ | ○○ | 1270 | 42 | 91 | 18.4 |
| Example 11 | 1.9 | ○○ | ○○ | ○ | ○○ | 1210 | 41 | 89 | 18.3 |
| Example 12 | 1.4 | ○○ | ○○ | ○ | ○○ | 1200 | 40 | 88 | 18.1 |
| Example 13 | 4.9 | ○○ | ○○ | ○ | ○○ | 1280 | 42 | 93 | 19.5 |
| Example 14 | 3.8 | ○○ | ○○ | ○ | ○○ | 1250 | 40 | 92 | 19.4 |
| Example 15 | 3.3 | ○○ | ○○ | ○ | ○○ | 1230 | 39 | 93 | 19.2 |
| Example 16 | 4.9 | ○○ | ○○ | ○ | ○○ | 1320 | 41 | 93 | 19.8 |
| Example 17 | 4.4 | ○○ | ○○ | ○ | ○○ | 1280 | 39 | 92 | 19.8 |
| Example 18 | 3.9 | ○○ | ○○ | ○ | ○○ | 1260 | 38 | 92 | 19.5 |
| Example 19 | 4.5 | ○○ | ○○ | ○ | ○○ | 1270 | 43 | 94 | 19.1 |
| Example 20 | 3.9 | ○○ | ○○ | ○ | ○○ | 1250 | 40 | 93 | 18.8 |
| Example 21 | 3.5 | ○○ | ○○ | ○ | ○○ | 1220 | 38 | 91 | 18.4 |
| Example 22 | 1.4 | ○○ | ○○ | ○ | ○○ | 950 | 55 | 76 | 14.5 |
| Example 23 | 18.9 | ○ | Δ | ○○ | Δ | 1680 | 12 | 65 | 17.3 |
| Example 24 | 2.5 | ○○ | ○○ | ○ | ○○ | 1210 | 52 | 85 | 27.9 |
| Example 25 | 1.9 | ○○ | ○○ | ○ | ○○ | 1120 | 36 | 70 | 16.2 |
| Example 26 | 1.8 | ○○ | ○○ | ○ | ○ | 1260 | 34 | 56 | 16.4 |
| Example 27 | 1.9 | ○○ | ○○ | ○ | ○ | 900 | 55 | 58 | 42.6 |
| Example 28 | 2.0 | ○○ | ○○ | ○ | ○○ | 1260 | 30 | 57 | 10.8 |
| Example 29 | 2.2 | ○○ | ○○ | ○ | ○○ | 1340 | 36 | 77 | 12.5 |
| Example 30 | 1.5 | ○○ | ○○ | ○ | ○○ | 1080 | 42 | 92 | 6.8 |
| Comparative Example 1 | 0.8 | — | — | x | ○○ | 1100 | 58 | 72 | 14.2 |
| Comparative Example 2 | — | — | — | — | — | — | — | — | — |
| Comparative Example 3 | 1.9 | Δ | x | ○ | ○○ | 1050 | 34 | 60 | 8.7 |
| Comparative Example 4 | 1.3 | Δ | x | ○ | ○○ | 1000 | 32 | 58 | 16.6 |
| Comparative Example 5 | 1.1 | Δ | x | ○ | ○○ | 980 | 31 | 57 | 16.3 |
| Comparative Example 6 | 4.1 | Δ | x | ○ | ○○ | 1080 | 34 | 73 | 17.0 |
| Comparative Example 7 | 3.3 | Δ | x | ○ | ○○ | 1050 | 33 | 71 | 17.0 |
| Comparative Example 8 | 2.8 | Δ | x | ○ | ○○ | 1010 | 32 | 72 | 16.8 |
| Comparative Example 9 | 3.5 | x | x | ○ | ○○ | 1020 | 34 | 73 | 16.6 |
| Comparative Example 10 | 2.9 | x | x | ○ | ○○ | 1000 | 33 | 71 | 16.4 |
| Comparative Example 11 | 2.7 | x | x | ○ | ○○ | 1010 | 33 | 72 | 16.2 |
| Comparative Example 12 | 2.0 | Δ | x | ○ | ○○ | 1070 | 34 | 73 | 16.6 |
| Comparative Example 13 | 1.4 | Δ | x | ○ | ○○ | 1030 | 33 | 71 | 16.5 |
| Comparative Example 14 | 1.1 | Δ | x | ○ | ○○ | 1010 | 32 | 70 | 16.3 |
| Comparative Example 15 | 3.8 | x | x | ○ | ○○ | 1080 | 34 | 74 | 17.6 |
| Comparative Example 16 | 2.8 | x | x | ○ | ○○ | 1050 | 32 | 73 | 17.5 |
| Comparative Example 17 | 2.4 | x | x | ○ | ○○ | 1030 | 31 | 73 | 17.3 |
| Comparative Example 18 | 3.8 | x | x | ○ | ○○ | 1100 | 33 | 74 | 17.8 |
| Comparative Example 19 | 3.3 | x | x | ○ | ○○ | 1050 | 31 | 73 | 17.6 |
| Comparative Example 20 | 3.2 | x | x | ○ | ○○ | 1040 | 30 | 73 | 17.6 |
| Comparative Example 21 | 3.4 | x | x | ○ | ○○ | 1050 | 33 | 75 | 17.5 |
| Comparative Example 22 | 3.1 | x | x | ○ | ○○ | 1020 | 32 | 73 | 17.4 |
| Comparative Example 23 | 2.9 | x | x | ○ | ○○ | 1010 | 30 | 71 | 17.2 |

TABLE 3-continued

| | Shear adhesive force (Mpa) | | Peel adhesive force (N/25 mm) | | Impact resistance | Cold resistance | |
|---|---|---|---|---|---|---|---|
| | SUS 304 | SPCC steel plate | Initial strength | Storage at 85 C. 85% for 168 hrs | Charpy impact value (J/m2) | Number of broken samples (pcs/10 pcs) | Nozzle clogging test (h) |
| Example 1 | 22.3 | 29.2 | 210 | 190 | 3.8 | 2 | 57 |
| Example 2 | 21.6 | 28.7 | 230 | 210 | 3.9 | 2 | 60 |
| Example 3 | 21.5 | 28.1 | 220 | 200 | 3.8 | 2 | 57 |
| Example 4 | 22.3 | 30.1 | 220 | 200 | 3.9 | 2 | 42 |
| Example 5 | 21.7 | 28.5 | 240 | 220 | 3.9 | 2 | 45 |
| Example 6 | 21.5 | 28.1 | 230 | 210 | 3.8 | 3 | 45 |
| Example 7 | 22.4 | 29.1 | 210 | 190 | 3.9 | 2 | 33 |
| Example 8 | 21.5 | 28.5 | 220 | 200 | 3.9 | 2 | 36 |
| Example 9 | 21.1 | 27.9 | 210 | 190 | 3.8 | 3 | 30 |
| Example 10 | 22.2 | 29.1 | 210 | 190 | 3.9 | 2 | 48 |
| Example 11 | 22.1 | 28.7 | 220 | 200 | 3.9 | 2 | 45 |
| Example 12 | 21.8 | 28.4 | 220 | 200 | 3.7 | 3 | 45 |
| Example 13 | 24.5 | 31.1 | 240 | 220 | 4.0 | 3 | 30 |
| Example 14 | 24.1 | 30.8 | 250 | 230 | 3.9 | 3 | 36 |
| Example 15 | 24.2 | 30.7 | 230 | 210 | 3.7 | 3 | 33 |
| Example 16 | 25.4 | 33.5 | 240 | 220 | 3.9 | 3 | 39 |
| Example 17 | 25.1 | 32.8 | 230 | 210 | 3.8 | 3 | 39 |
| Example 18 | 24.9 | 32.9 | 220 | 200 | 3.6 | 3 | 36 |
| Example 19 | 24.4 | 31.6 | 250 | 150 | 3.8 | 3 | 42 |
| Example 20 | 24.1 | 31.1 | 230 | 140 | 3.6 | 3 | 42 |
| Example 21 | 23.8 | 30.9 | 220 | 130 | 3.5 | 3 | 42 |
| Example 22 | 17.4 | 17.5 | 230 | 240 | 4.2 | 4 | 66 |
| Example 23 | 19.8 | 19.6 | 110 | 80 | 1.2 | 5 | 24 |
| Example 24 | 35.7 | 42.8 | 260 | 230 | 4.8 | 10 | 45 |
| Example 25 | 21.8 | 16.2 | 150 | 140 | 3.2 | 2 | 54 |
| Example 26 | 21 | 27 | 110 | 90 | 2.5 | 3 | 51 |
| Example 27 | 48.9 | 57.2 | 110 | 90 | 2.5 | 3 | 54 |
| Example 28 | 19.2 | 28.7 | 150 | 130 | 3.7 | 2 | 48 |
| Example 29 | 22.3 | 29.1 | 140 | 120 | 3.6 | 3 | 48 |
| Example 30 | 20.3 | 27.6 | 260 | 234 | 3.1 | 2 | 60 |
| Comparative Example 1 | 16.8 | 17.1 | 280 | 110 | 4.1 | 6 | 72 |
| Comparative Example 2 | — | — | — | — | — | — | — |
| Comparative Example 3 | 20.1 | 26.3 | 200 | 80 | 3.0 | 9 | 12 |
| Comparative Example 4 | 19.4 | 25.8 | 210 | 90 | 3.1 | 9 | 12 |
| Comparative Example 5 | 19.4 | 25.3 | 200 | 80 | 3.0 | 9 | 12 |
| Comparative Example 6 | 20.5 | 27.1 | 210 | 80 | 3.1 | 9 | 12 |
| Comparative Example 7 | 19.5 | 25.6 | 210 | 80 | 3.1 | 10 | 12 |
| Comparative Example 8 | 19.4 | 25.3 | 210 | 80 | 3.0 | 10 | 12 |
| Comparative Example 9 | 20.2 | 25.2 | 200 | 30 | 3.1 | 10 | 6 |
| Comparative Example 10 | 19.4 | 25.7 | 200 | 80 | 3.1 | 9 | 9 |
| Comparative Example 11 | 19.0 | 25.1 | 180 | 80 | 3.0 | 10 | 6 |
| Comparative Example 12 | 20.1 | 26.2 | 200 | 80 | 3.1 | 9 | 12 |
| Comparative Example 13 | 19.9 | 25.8 | 200 | 80 | 3.1 | 9 | 12 |
| Comparative Example 14 | 19.6 | 25.6 | 190 | 70 | 3.0 | 10 | 12 |
| Comparative Example 15 | 22.1 | 28 | 210 | 80 | 3.2 | 9 | 9 |
| Comparative Example 16 | 21.7 | 27.7 | 220 | 90 | 3.1 | 10 | 9 |
| Comparative Example 17 | 21.8 | 27.5 | 210 | 80 | 2.9 | 10 | 9 |
| Comparative Example 18 | 22.9 | 30.2 | 220 | 90 | 3.1 | 10 | 9 |
| Comparative Example 19 | 22.6 | 29.6 | 220 | 90 | 3.0 | 10 | 9 |

TABLE 3-continued

| | | | | | | | |
|---|---|---|---|---|---|---|---|
| Comparative Example 20 | 22.4 | 29.6 | 200 | 80 | 2.3 | 10 | 6 |
| Comparative Example 21 | 22.1 | 28.1 | 210 | 90 | 3.1 | 9 | 9 |
| Comparative Example 22 | 21.6 | 27.6 | 200 | 60 | 3.0 | 10 | 9 |
| Comparative Example 23 | 21.4 | 27.5 | 190 | 60 | 2.9 | 9 | 9 |

INDUSTRIAL APPLICABILITY

The present invention can provide an epoxy adhesive composition capable of reducing re-aggregation of an adhesive layer modifier, maintaining favorable viscosity for a long period of time, exhibiting high adhesiveness, and reducing process failures during application of the adhesive.

The invention claimed is:

1. An epoxy adhesive composition comprising:
    a modified polyvinyl acetal resin having a constitutional unit with an acid-modified group;
    an adhesive layer modifier; and
    an epoxy resin,
    wherein the epoxy adhesive composition has a ratio of an acid-modified group equivalent of the modified polyvinyl acetal resin to an epoxy equivalent of the epoxy resin (acid-modified group equivalent/epoxy equivalent) of 5.0 to 150.0,
    the epoxy adhesive composition has a number ratio of the acid-modified group to an epoxy group (acid-modified group number/epoxy group number) of 0.0005 to 0.5, and
    the amount of the modified polyvinyl acetal resin is 0.5 parts by weight or more and 100 parts by weight or less per 100 parts by weight of the epoxy resin.
2. The epoxy adhesive composition according to claim 1, wherein the acid-modified group is a carboxyl group.
3. The epoxy adhesive composition according to claim 1, wherein the modified polyvinyl acetal resin has the constitutional unit with the acid-modified group in a side chain.
4. The epoxy adhesive composition according to claim 1, wherein the amount of the constitutional unit with the acid-modified group in the modified polyvinyl acetal resin is 0.01 to 10 mol %.
5. The epoxy adhesive composition according to claim 1, wherein the modified polyvinyl acetal resin has an acetal group content of 60 to 90 mol %.
6. The epoxy adhesive composition according to claim 1, wherein the modified polyvinyl acetal resin has an average degree of polymerization of 150 to 4,500.
7. The epoxy adhesive composition according to claim 1, wherein the modified polyvinyl acetal resin has a ratio of a butyral group content and an acetoacetal group content (butyral group content:acetoacetal group content) of 4:6 to 0:10.
8. The epoxy adhesive composition according to claim 1, wherein the adhesive layer modifier has a BET specific surface area of 0.001 to 350 $m^2/g$.
9. The epoxy adhesive composition according to claim 1, wherein the adhesive layer modifier has a bulk density of 0.05 to 5.0 $g/cm^3$.
10. The epoxy adhesive composition according to claim 1, wherein the adhesive layer modifier has a water content of 0.01% to 3.0%.
11. The epoxy adhesive composition according to claim 1, wherein the adhesive layer modifier is a metal compound.
12. The epoxy adhesive composition according to claim 1, wherein the adhesive layer modifier has a dispersion diameter (D50) of 0.1 to 100 μm, a dispersion diameter (D10) of 0.01 to 20 μm, and a dispersion diameter (D90) of 0.5 to 1,000 μm.
13. The epoxy adhesive composition according to claim 1, wherein the modified polyvinyl acetal resin has a particulate shape, and a dispersion diameter (D50) of the modified polyvinyl acetal resin and a dispersion diameter (D50) of the adhesive layer modifier satisfy a ratio (dispersion diameter (D50) of modified polyvinyl acetal resin/dispersion diameter (D50) of adhesive layer modifier) of 0.01 to 1,000.
14. The epoxy adhesive composition according to claim 1, wherein the molecular weight of the modified polyvinyl acetal resin and the molecular weight of the adhesive layer modifier satisfy a ratio (molecular weight of modified polyvinyl acetal resin/molecular weight of adhesive layer modifier) of 20 to 7,500,
    wherein the molecular weight of the modified polyvinyl acetal resin and the molecular weight of the adhesive layer modifier are calculated molecular weights, and the molecular weight of the modified polyvinyl acetal resin is calculated based on a degree of polymerization of the modified polyvinyl acetal resin, amount of each constitutional unit, and molecular weight of each constitutional unit.
15. The epoxy adhesive composition according to claim 1, which is a structural adhesive.
16. The epoxy adhesive composition according to claim 1, which is an adhesive for electronic materials.

* * * * *